United States Patent
O'Toole, Jr. et al.

(10) Patent No.: US 7,782,881 B1
(45) Date of Patent: *Aug. 24, 2010

(54) METHOD AND APPARATUS FOR TRAFFIC QUALITY AND BILLING AUTHORIZATION BY REQUEST TOKEN INSERTION

(75) Inventors: James W. O'Toole, Jr., Somerville, MA (US); James A. Aviani, Santa Barbara, CA (US); Joshua Miles Chase, Santa Barbara, CA (US)

(73) Assignee: Cisco Technology, Inc., San Jose, CA (US)

( * ) Notice: Subject to any disclaimer, the term of this patent is extended or adjusted under 35 U.S.C. 154(b) by 867 days.

This patent is subject to a terminal disclaimer.

(21) Appl. No.: 11/704,744

(22) Filed: Feb. 9, 2007

Related U.S. Application Data (63) Continuation of application No. 10/166,873, filed on Jun. 11, 2002, now Pat. No. 7,187,681.

(51) Int. Cl.
*H04L 12/28* (2006.01)
*G06F 15/173* (2006.01)

(52) U.S. Cl. .................. 370/401; 709/238; 713/201

(58) Field of Classification Search .............. 370/230, 370/238, 230.1, 400, 401; 705/18, 26, 76; 713/201; 709/234–235
See application file for complete search history.

(56) References Cited

U.S. PATENT DOCUMENTS

| | | | | |
|---|---|---|---|---|
| 5,905,872 A | * | 5/1999 | DeSimone et al. | 370/401 |
| 6,052,785 A | * | 4/2000 | Lin et al. | 709/225 |
| 6,119,167 A | * | 9/2000 | Boyle et al. | 709/234 |
| 6,240,462 B1 | * | 5/2001 | Agraharam et al. | 370/238 |
| 6,324,525 B1 | | 11/2001 | Kramer et al. | 705/40 |
| 6,335,927 B1 | | 1/2002 | Elliott et al. | 370/352 |
| 6,427,132 B1 | | 7/2002 | Bowman-Amuah | 703/22 |
| 6,826,599 B1 | | 11/2004 | Shaffer et al. | 709/213 |
| 6,938,171 B1 | * | 8/2005 | Isomichi et al. | 713/153 |
| 6,944,760 B2 | * | 9/2005 | Wills | 713/153 |
| 7,107,321 B1 | | 9/2006 | Shaffer et al. | 709/213 |
| 7,146,505 B1 | * | 12/2006 | Harada et al. | 705/18 |
| 7,187,681 B1 | * | 3/2007 | O'Toole et al. | 370/401 |
| 2001/0023451 A1 | | 9/2001 | Hericourt | 709/232 |
| 2002/0143981 A1 | | 10/2002 | DeLima et al. | 709/233 |
| 2004/0117426 A1 | | 6/2004 | Rudkin et al. | 709/200 |
| 2004/0148393 A1 | | 7/2004 | Breiter et al. | 709/225 |

* cited by examiner

*Primary Examiner*—Steven H Nguyen
(74) *Attorney, Agent, or Firm*—BainwoodHuang (57) ABSTRACT

Internet services are differentiated by including user-reflexive data with a user request. The user-reflexive data may specify a quality of service to be accorded the return data and also billing information to improve detail of bills for billed Internet services. The user-reflexive data is included with the user request and data transmission is adjusted accordingly. Alternatively, the user-reflexive data is sent out-of-band.

18 Claims, 5 Drawing Sheets

METHOD AND APPARATUS FOR TRAFFIC QUALITY AND BILLING AUTHORIZATION BY REQUEST TOKEN INSERTION

CROSS REFERENCE TO RELATED APPLICATIONS

This Patent Application is a Continuation of U.S. patent application Ser. No. 10/166,873 filed on Jun. 11, 2002, entitled, "METHOD AND APPARATUS FOR TRAFFIC QUALITY AND BILLING AUTHORIZATION BY REQUEST TOKEN INSERTION", the contents and teachings of which are hereby incorporated by reference in their entirety.

TECHNICAL FIELD

The present invention relates, in general, to networking technologies, and more particularly to network devices for differentiating Internet services.

BACKGROUND

Advancements in computer and networking technologies have resulted in the creation of computer and information networks such as the Internet which interconnect many thousands of computer systems together to allow them to share information. The computers are connected to one another by digital networks made up of telecommunications facilities, digital switches, bridges, hubs, servers, other computers, etc. Users are able to access the information, for example, using a web browser software program running on a desktop or other type of computer.

The typical manner for obtaining such information is for a user to identify a desired web page or document by specifying in a user request a uniform resource locator (URL) to a web browser software program. The URL will typically specify a location address of a server holding the web page, a file name identifying the web page to the user computer and a communications protocol (e.g. the hypertext transport protocol or http) that the web browser and server should use for the exchange of the content. When a web browser receives a user request for a web page, the web server can respond by obtaining and returning, over the computer network, the contents of the document specified in the request to the requesting web browser.

The Internet can provide, to the consuming public, information originating from all over the world. Users can also access search engines to locate sought-after information, display the information from web sites, search through documents, link to other web sites, etc. in order to view information of interest.

Access network providers have limited means to differentiate their Internet subscriber services because simple packet forwarding is a commodity service, content services are complex and involve larger numbers of publishers with direct consumer relationships, and customers have specific expectations about IP connectivity services. For example, customers are fearful of highly variable charges, and customers are reluctant to pay higher levels of fixed recurring charges unless those charges are clearly identified with a specific benefit presented in an understandable way.

Quality of Service (QoS) is an example of an IP connectivity service, that, were it readily applied to end-user visible traffic, could help differentiate content services in access networks. It is, however difficult for service providers to use QoS to accomplish genuine service differentiation for a variety of reasons

SUMMARY

Current Internet switch technology does not support associating data about the user with a user request at the metadata level in order to differentiate Internet services and in order to facilitate billing for particular services. It is desirable to have a method and apparatus to associate user-reflexive data with a user request for Internet services.

The present invention contributes to an access provider's ability to differentiate services that it provides to subscribers and also to a content provider's ability to bill for content requested by a client. A client is identified to network devices and to a destination server by user-reflexive data associated with each user request for services. User-reflexive data is data that is referenced to the user such as quality of service to be accorded to data sent to the user, billing information, and targeted information preferences. In a first embodiment of the invention, Layer 7 labeling is associated with the user request. In a second embodiment, an out-of-band signal is used to carry the user-reflexive data. The network devices and the server are alerted to provide a particular quality of service to the request and response traffic. In addition, the user-reflexive data can be used to provide client billing information to the server. The billing information is, using the method of the present invention, tied to the request in a way that makes it easy to maintain records at the provider end of a transaction and makes it easy to understand what content or service was received for a particular charge at the customer end of the transaction.

More specifically, embodiments of the invention provide methods and apparatus that provide user-reflexive data with the user request. One such method embodiment includes receiving a user request at a first network device, then associating at the first network device user-reflexive data with the user request, then transmitting the user request with the associated user-reflexive data to a second network device, determining return data instructions from said user-reflexive data at the second network device, and forwarding the user request and return data instructions to a destination. The user-reflexive data may include a quality of service to be accorded the return data, billing information and user preferences for targeted information. Accordingly, an Internet access provider is able to provide a consistent quality of service for those users subscribing to a particular service, content providers are able to provide detailed bills to users, and content providers are also able to provide advertising and other targeted information to users who fall within a target group.

In another embodiment of the invention, the user-reflexive data is included with the user request as a token in the header. In a further embodiment of the invention, the token is a Layer 7 label. Accordingly, the overhead of conveying the user-reflexive data is minimized by including the user-reflexive data in the application layer header.

In another embodiment of the invention, the user-reflexive data is not included in the header of the user request, but rather transmitted over an out-of-band link between the first network device and the second network device. Accordingly, the user-reflexive data does not interfere with the data stream and the datagrams themselves do not need to be altered.

In another embodiment of the invention, a third network device at the destination server includes targeted information in the return data in response to the return data instructions. Accordingly, the content provider is able to respond to the user-reflexive information at the network interface.

DETAILED DESCRIPTION

The present invention contributes to an access provider's ability to differentiate services that it provides to subscribers and also to a content provider's ability to bill for content requested by a client. A client is identified to network devices and to a destination server by user-reflexive data associated with each user request for services. User-reflexive data is data that is referenced to the user such as quality of service to be accorded to data sent to the user, billing information, and targeted information preferences. In a first embodiment of the invention, Layer 7 labeling is associated with the user request. In a second embodiment, an out-of-band signal is used to carry the user-reflexive data. The network devices and the server are alerted to provide a particular quality of service to the request and response traffic. In addition, the user-reflexive data can be used to provide client billing information to the server. The billing information is, using the method of the present invention, tied to the request in a way that makes it easy to maintain records at the provider end of a transaction and makes it easy to understand what content or service was received for a particular charge at the customer end of the transaction.

Figure 1:
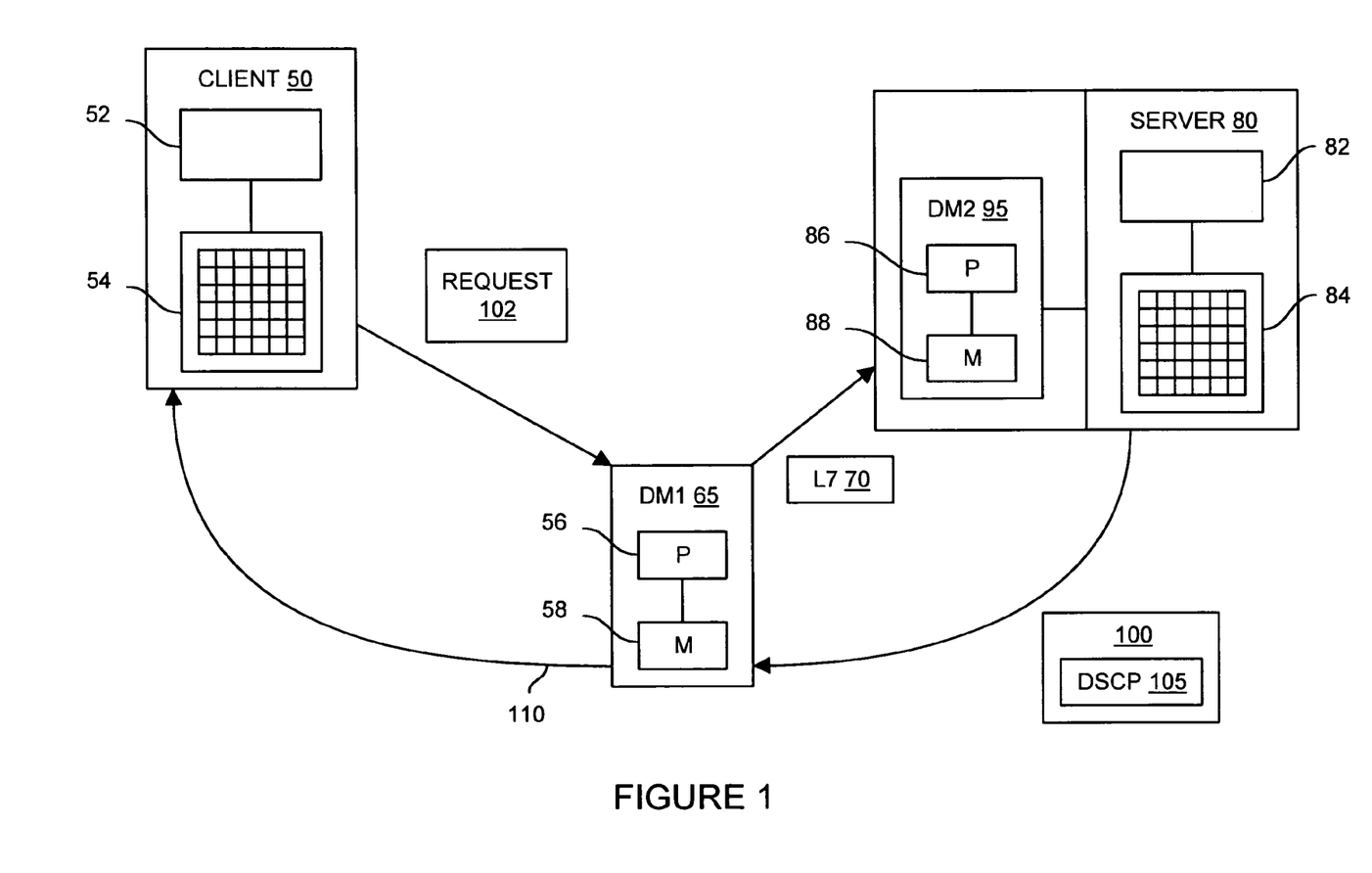
FIG. 1 is a block diagram of a client system and a server system connected through a plurality of network devices operating according to principles of the present invention.

FIG. 1 is a diagram of a client/server system connected together in a large network, such as the Internet, operating according to principles of the present invention. A client 50 having a first processor 52 and a first memory 54 is connected through a first network device 65 having a second processor 56 and a second memory 58 and a second network device 95 having a third processor 86 and a third memory 88 to a server 80 having a server processor 82 and a server memory 84. The first network device 65, DM1, is, for example, a network switch configured to operate according to principles of the present invention. DM1 65 receives a data request 102 from the client 50. DM1 65 interprets the traffic at Layer 7, determines the client information and inserts Layer 7 labels in the forward traffic to the server 80. The Layer 7 labels include information about data handling or about the client to the data request 102. In this embodiment of the invention, DM1 65 determines the client information from the data traffic itself. In one arrangement, the client information includes quality of service (QoS) to be provided to data returned to the user. In another arrangement, the client information includes billing information. In yet another arrangement, the client information includes user preferences for targeted information. The present invention is not limited to the listed types of information. In the present embodiment of the invention, DM1 65 attaches the user-reflexive data by including a Layer 7 label in the header of the data request 102 forwarded to the server 80.

In alternative embodiments of the invention, one or more tokens of a type other than L7 are added to the data request thereby inserting client information into the forward data traffic. DM1 65 further makes adjustments to the data so that it will conform to the established connection even though the original data request 102 is altered with additional data. This is described in detail in U.S. patent application Ser. No. 10/044,216 filed Nov. 20, 2001 and entitled, "Methods and Apparatus for Inserting Data into a Communications Session" which is fully incorporated herein by reference.

The Open System Interconnection (OSI) standard defines a seven layer networking framework. Layer 7 is the application layer and it identifies communication partners, quality of service (QoS), and constraints on data syntax. Layer 7 provides application services for file transfers, e-mail, and other network application services. In the present embodiment of the invention, the Layer 7 label 70, or L7 label, is included in the HTTP header of the transmitted data request 102. The access provider has stored data about the client. DM1 65 attaches this information to the data request 102. While, in the present application, the invention will be described in terms of Internet protocol (IP), the invention is not limited to IP. Also, the data request and other forms of data transfer are referred to equivalently as data packets, datagrams, and messages. In an alternative embodiment of the invention, DM1 65 receives user-reflexive data to include in the L7 label 70 from an Internet access provider through which the client accesses the Internet. In another embodiment of the invention, the data is received from a database accessible by DM1 65.

DM1 65 forwards the labeled data to the server 80. The forwarded traffic is received by a second network device, DM2 95, which is for example, a second network switch. DM2 95 may be independent of the server or may be part of the server. DM2 95 decodes the L7 labels and adds Layer 2 (L2) and Layer 3 (L3) labels to the data and forward the data to the server 80. The server 80 responds to the client request and proceeds according to the received instructions. The server 80 also stores any billing data received with the client request. The server 80 builds data packets conforming to the instructions. The return packets 100, in this embodiment of the invention, have a Differentiated Services Code Point (DSCP) field 105 indicating the appropriate quality of service (QoS) for the return data traffic. The Internet Protocol (IP) header has a plurality of fields. One of the fields is the DSCP field, also called the Type of Service field. This field is used to indicate a particular quality of service to be accorded the packet.

The return data traffic is returned via DM1 65. DM1 65 modifies the return traffic to remove the transmission adjustments made in the forward traffic.

Figure 2:
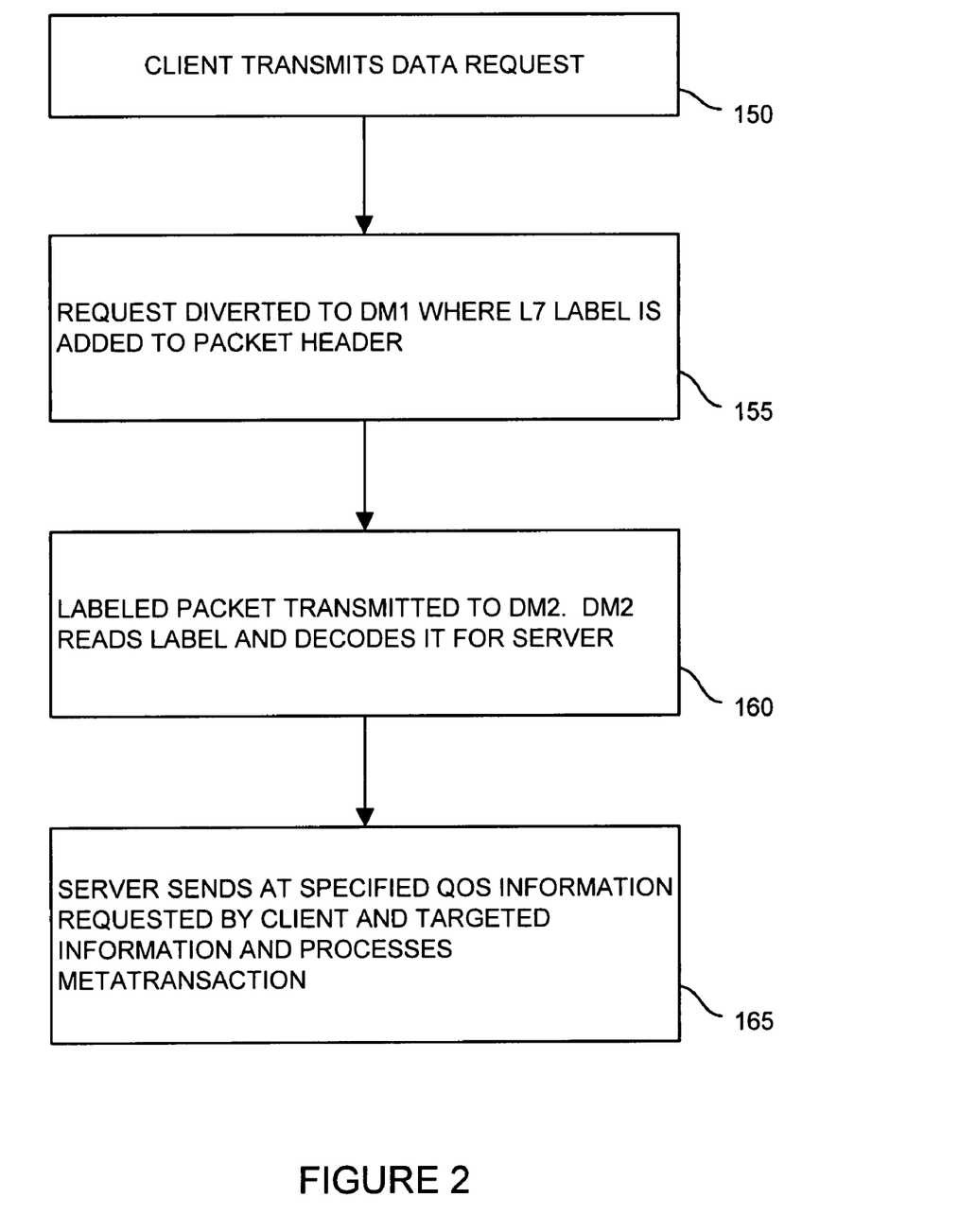
FIG. 2 is a flow chart of the process of the system of FIG. 1.

FIG. 2 shows the method of the system of FIG. 1. The client transmits a data request 102 to the server, block 150. The client may transmit the data request 102 directly over a network connection or the client may be connected to the Internet through an Internet access provider through which the client sends the data request 102.

The request is diverted to the network device DM1 65. DM1 65 attaches user-reflexive data such as QoS and billing information to the data request, block 155. In one embodiment of the invention, DM1 65 adds an L7 label 70 to the packet header of the data request. An HTTP request header has a plurality of lines. The plurality of lines comprises a plurality of field names and each field name has one or more lines of associated command codes. The HTTP request header fields allow the client to pass data about the request and about the client itself to the server. The present invention is not limited to quality of service and billing information.

Other information that may be encoded into the data request 102 includes information about user preferences for targeted information.

The data request 102 and user-reflexive data is then transmitted to a second network device, DM2, block 160. In the embodiment of the invention using L7 labeling, DM2 95 reads the L7 label 70 and decodes it for the server. DM2 95 forwards the data request 102 along with the decoded information to the server.

The server receives the decoded information from DM2 95. The decoded information contains information about the client such as the quality of service to provide, billing information and advertising preferences. In response, the server sends the requested information and targeted information, if any, and packages it into packets having the appropriate QoS indication, block 165. The billing information, if any, may be recorded in association with the transaction so that specific requests for information may be matched in the bill sent to the consumer at the client system.

Figure 3:
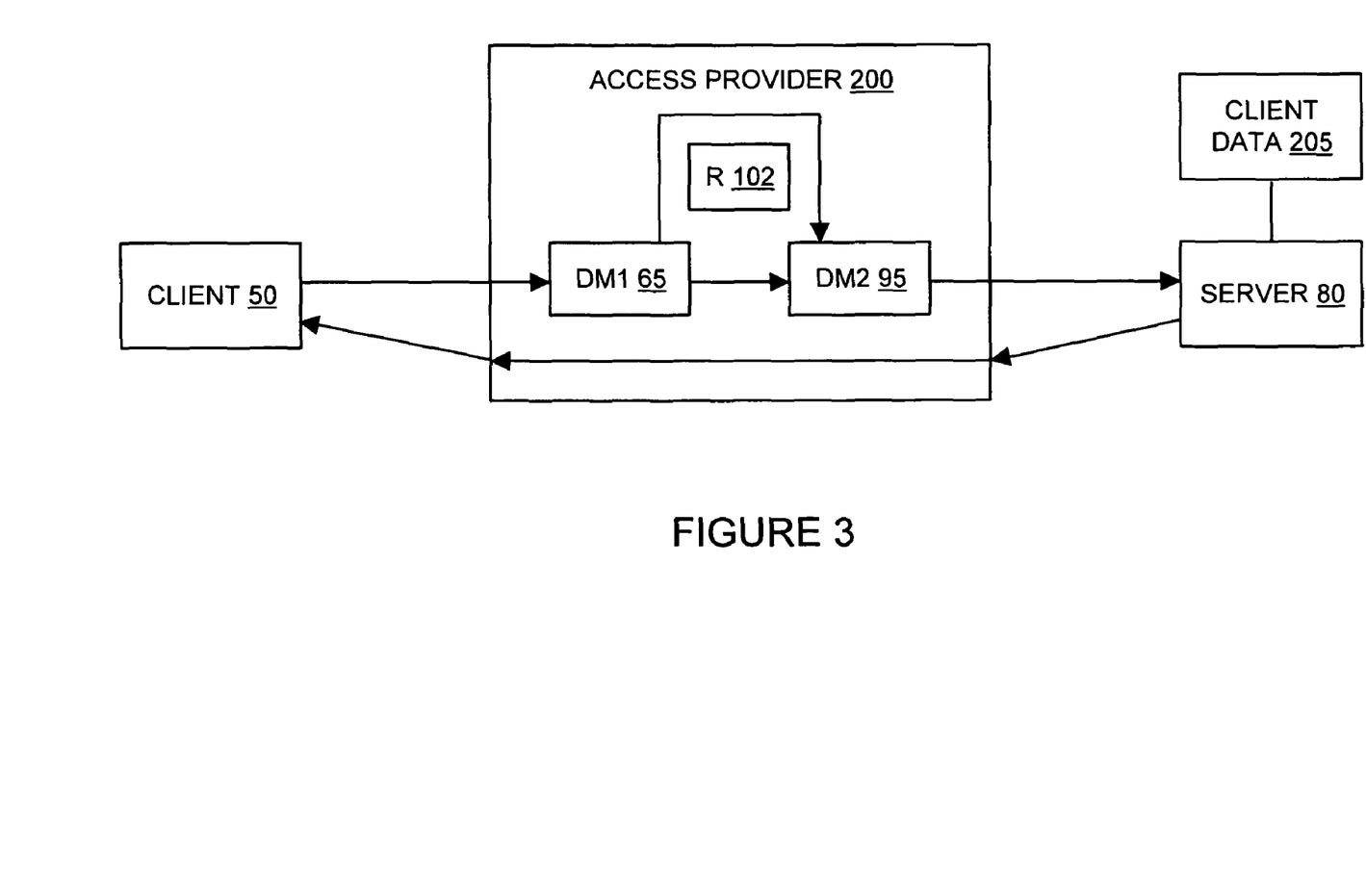
FIG. 3 is a block diagram of a first alternative embodiment of the present invention in which the client and the server are connected through an access provider.

FIG. 3 is a second embodiment of the invention. The client 50 accesses the server 80 through an access provider 200. The access provider 200 maintains the network devices DM1 65 and DM2 95 where DM1 65 is a client interface and DM2 95 is a server interface. The access provider 200 has stored data about the client 50. DM1 65 interprets data traffic from the client at Layer 7. The access provider 200 knows client information and inserts L7 labels with client information in forward traffic. In an alternative embodiment of the invention, DM1 65 sends an out-of-band message to DM2 95 with the client information. DM2 95 decodes the L7 labels and recodes the traffic with L2 and L3 labels and forwards the recoded traffic to the server. In the alternative embodiment of the invention, DM2 95 receives the out-of-band message and adds the L2 and L3 labels to the forwarded data traffic.

The server 80 has a client data store 205 that is consulted when the server 80 receives the recoded client request. The client data store 205 contains additional client information that the server uses in interpreting the Layer 2 and Layer 3 labels. The client data store 205 is consulted for targeted information, such as advertising matching the user's profile, to send to the user in response to the decoded information received from the client. In an alternative embodiment of the invention, the client data store 205 may also include return data instructions. The server 80 builds the packets according to the instructions and sends the packets to the access provider 200 and the access provider 200 sends them to the client system 50.

Figure 4:
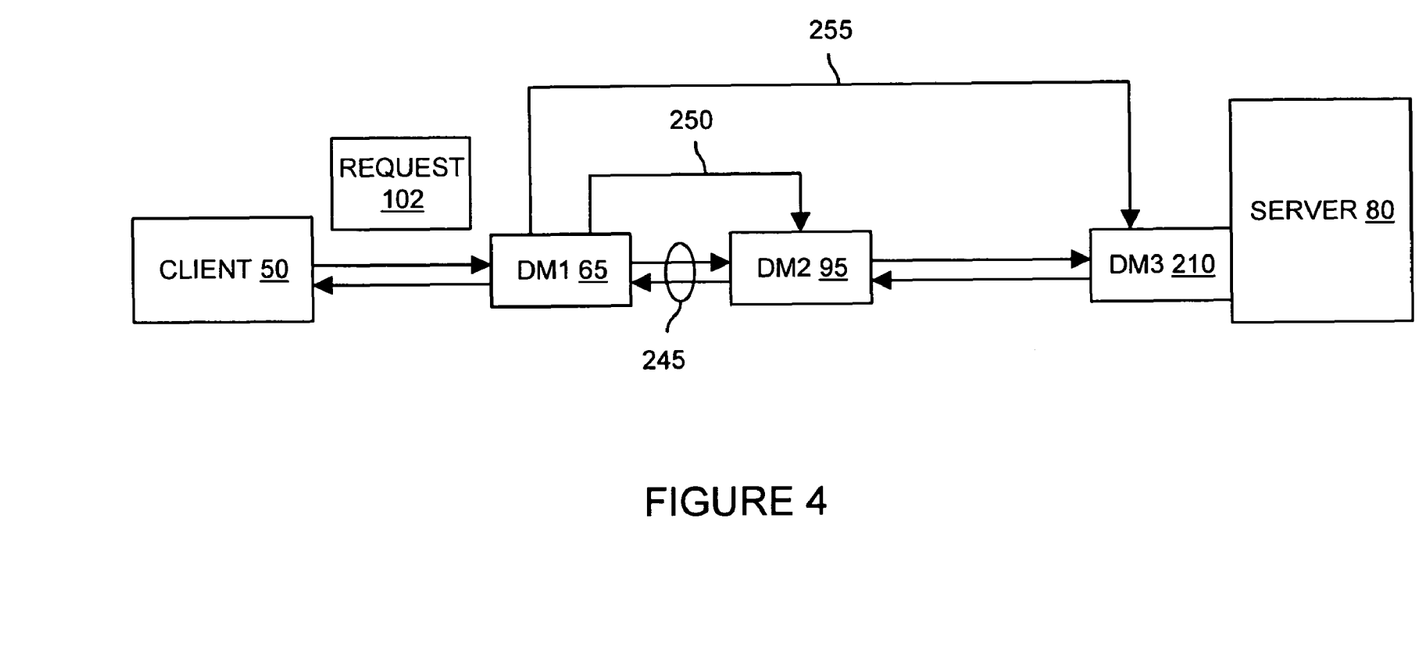
FIG. 4 is a block diagram of a second alternative embodiment of the present invention in which a first network device sends out-of-band instructions to a second network device.

FIG. 4 is a third embodiment of the invention. A data request 102 from the client 50 is received at DM1 65. DM1 65 sends client data to DM2 95 in L7 labels over the data connection 245. Alternatively, DM1 65 sends an out-of-band signal 250 of client data to DM2 95. In the out-of-band alternative of the invention, DM1 65 sends billing code data to DM3 210, also by an out-of-band signal 255. DM1 65 forwards the data request 102 to DM2 95 across a network connection.

DM2 95 decodes the L7 labels received from DM1 65 across the network connection, recodes the traffic with L2 and L3 labels and forwards the traffic to DM3 210. In the out-of-band alternative embodiment, DM2 95 receives the out-of-band signal and encodes the traffic with L2 and L3 labels and forwards the data request 102.

DM3 210 maintains the per-session state of the incoming data traffic and put L2 and L3 labels onto the return traffic that correspond with the L2 and L3 labels that it observed in the incoming traffic. In an alternative embodiment of the invention, DM3 210 also decodes the L2 and L3 labels and provides the client information to the server 80.

From the DM3 210, the return traffic continues through DM2 95 and DM1 65 to the client 50 where DM2 95 and DM1 remove any adjustments in the return traffic that were consequences of traffic adjustments made in the forward traffic.

Figure 5:
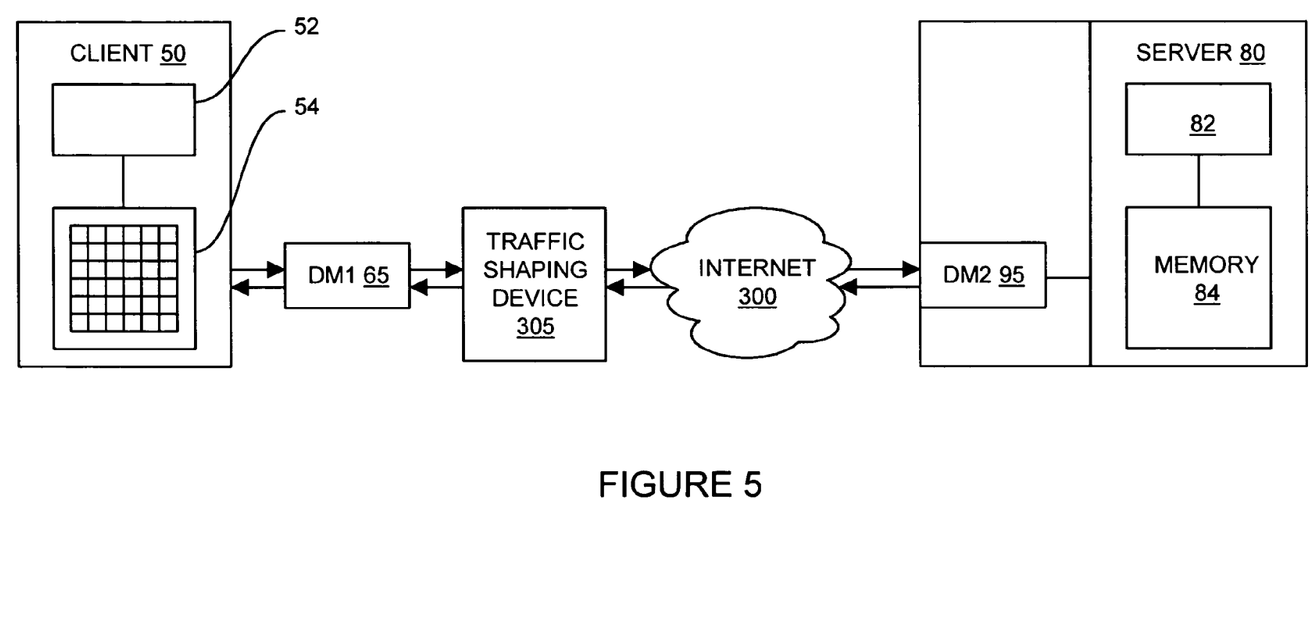
FIG. 5 is a block diagram of a third alternative embodiment of the present invention in which a traffic shaping device is included to enforce a particular quality of service.

FIG. 5 is a fourth embodiment of the invention. This embodiment is similar to the embodiment of the invention described in relation to FIG. 1. The client 50 and the server 80 are connected together in a large network including, for example, the Internet 300. DM1 65 receives a data request from the client 50 and attaches information about data handling or about the client to the data request. The information may include QoS to be provided, billing information, and so forth. DM1 65 accomplishes this in the present embodiment of the invention by attaching a Layer 7 label 70 to the data request.

DM1 65 forwards the labeled data to a traffic shaping device 305. Traffic shaping is the general term given to a broad range of techniques designed to enforce prioritization policies on the transmission of data over a network link. Traffic shaping enables the implementation of a specific policy that alters the way in which data is queued for transmission. Traffic shaping affects only data to be transmitted across a link. The traffic shaping device 305 addresses the problem of maintaining QoS that is consistent between a client's request and a server's response. One of the problems in the Internet is returning data having a QoS that is consistent with the client's data request.

The forwarded traffic is forwarded across the network and is received by a second network device, DM2 95. DM2 95 may be independent of the server or may be part of the server. DM2 95 interprets the labeled data and forwards the interpreted data to the server 80. The server 80 responds to the client request and proceeds according to the received instructions. The server 80 also stores any billing data received with the client request. The server 80 builds data packets conforming to the instructions. The DSCP field 105 of the return packets 100 indicate the appropriate quality of service (QoS) for the return data traffic. The return data traffic is returned over the network and then through the traffic shaping device 305 and DM1 65. The traffic-shaping device 305 acts to enforce the QoS in the return traffic that was requested by the client in the user-reflexive data.

In alternative embodiments of the invention, a software shaping technique such as Resource ReSerVation Protocol (RSVP) may be used instead of a shaping device. In the alternative embodiment of the invention, the server uses RSVP to request a specific QoS from the network, for the return data. RSVP carries the request through the network, visiting each node the network uses to carry the data. At each node, RSVP attempts to make a resource reservation for the stream.

Other embodiments of the invention include a computer system, such as a data communications device, computerized device, or other device configured with software and/or circuitry to process and perform all of the method operations noted above and disclosed herein as embodiments of the invention. In such embodiments, the device, such as a data communications device comprises at least one communications interface (e.g., a network interface), a memory (e.g., any type of computer readable medium, storage or memory system), a processor and an interconnection mechanism connecting the communications interface, the processor and the memory. In such embodiments, the memory system is encoded with a connection replication system that when performed on the processor, produces a process that causes the computer system to perform any and/or all of the method embodiments, steps and operations explained herein as embodiments of the invention. In other words, a computer, switch, router, gateway, network bridge, proxy device or other network device that is programmed or otherwise configured to operate as explained herein is considered an embodiment of the invention.

Other arrangements of embodiments of the invention that are disclosed herein include software programs to perform the method embodiment steps and operations summarized above and disclosed in detail below. As an example, a data communications device software control application, such as a data communications device operating system configured with a traffic quality and billing authorization system that operates as explained herein is considered an embodiment of the invention. More particularly, a computer program product is disclosed which has a computer-readable medium including computer program logic encoded thereon that, when executed on at least one processor with a computerized device, causes the processor to perform the operations (e.g., the methods) indicated herein is considered an embodiment of the invention. Such embodiments of the invention are typically embodied as software, logic instructions, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). These software or firmware or other such configurations can be installed onto a computer system, data communications device or other dedicated or general purpose electronic device to cause such a device to perform the techniques explained herein as embodiments of the invention.

The embodiments of the invention may be implemented by computer software and/or hardware mechanisms within a data communications device apparatus. It is to be understood that the system of the invention can be embodied strictly as a software program, as software and hardware, or as hardware and/or circuitry alone. The features of the invention, as explained herein, may be employed in data communications devices and other computerized devices and/or software systems for such devices such as those manufactured by Cisco Systems, Inc. of San Jose, Calif.

It is to be understood that the above-described embodiments are simply illustrative of the principles of the invention. Various and other modifications and changes may be made by those skilled in the art which will embody the principles of the invention and fall within the spirit and scope thereof.

What is claimed is:

1. A method, comprising:
   receiving a user request at a first network device;
   associating, at the first network device, user-reflexive data with the user request, the user-reflexive data including data that is referenced to the user;
   transmitting the user request and the associated user-reflexive data from the first network device to a second network device; and
   providing, from the second network device, the user request and return data instructions to a destination server to direct the destination server to respond with return data according to the return data instructions, the return data instructions being based on the user-reflexive data;
   wherein transmitting the user request and the associated user-reflexive data includes (i) sending a first communications signal containing the user request from the first network device to the second network device through a network, and (ii) substantially contemporaneously sending a second communications signal containing the user-reflexive data from the first network device to the second network device through the network, the second communications signal being out-of-band through the network relative to the first communications signal.

2. A method as in claim 1, wherein the user-reflexive data includes a quality of service to be accorded to data returned in response to the user request.

3. A method as in claim 1, wherein the user-reflexive data includes billing information associated with the user request.

4. A method as in claim 1, wherein the user-reflexive data includes targeted information preferences.

5. A method as in claim 1, further comprising:
   receiving the output user request and return data instructions at a third network device at the destination server; and
   transmitting return data to the user according to the return data instructions.

6. A method as in claim 5, wherein transmitting the return data includes inserting a quality of service indicator into a header of the return data.

7. A method as in claim 6, wherein the quality of service indicator is a DSCP field.

8. A method as in claim 5, wherein transmitting the return data includes transmitting the return data through a traffic shaping device to provide a quality of service in response to the data instructions.

9. A method as in claim 5, further comprising storing billing information in association with information about the user request and data transmitted in response to the request such that a detailed bill may be produced.

10. A method as in claim 1, wherein the first network device and the second network device are contained in a network access provider.

11. A method as in claim 1, wherein the second network device is included in the destination server.

12. A method as in claim 1, wherein the first network device and the second network device are configured to operate under access provider control, the first network device being configured as a client interface, and the second network device being configured as a server interface.

13. A system, comprising:
   a first network device to receive a user request from a client, the first network device to attach user-reflexive data to the user request, the user-reflexive data including data that is referenced to the user; and
   a second network device connected to the first network device to receive the user request and attached user-reflexive data from the first network device and to provide the user request and return data instructions to a destination server, the return data instructions being based on the user-reflexive data;
   whereby the server returns data in response to the user request in accordance with the return data instructions
   wherein the first network device is configured to (i) send a first communications signal containing the user request from the first network device to the second network device through a network, and (ii) substantially contemporaneously send a second communications signal containing the user-reflexive data from the first network device to the second network device through the network, the second communications signal being out-of-band through the network relative to the first communications signal.

14. A system as in claim 13, wherein the first network device and the second network device are included together in an Internet access provider.

15. A system as in claim 13, further comprising a client data store at the destination server, the client data store to provide targeted information to the client in response to the return data instructions.

16. A system as in claim 13, wherein the first network device and the second network device are configured to operate under access provider control, the first network device being configured as a client interface, and the second network device being configured as a server interface.

17. A computer program product that comprises a non-transitory computer readable medium having instructions stored thereon for authenticating a client device to a server device, such that the instructions, when carried out by a computer, cause the computer to:
   receive a user request at a first network device;
   associate, at the first network device, user-reflexive data with the user request, the user-reflexive data including data that is referenced to the user;
   transmit the user request and the associated user-reflexive data from the first network device to a second network device; and
   provide, from the second network device, the user request and return data instructions to a destination server to direct the destination server to respond with return data according to the return data instructions, the return data instructions being based on the user-reflexive data;
   wherein the instructions, when causing the computer to transmit the user request and the associated user-reflexive data cause the computer to (i) send a first communications signal containing the user request from the first network device to the second network device through a network, and (ii) substantially contemporaneously send a second communications signal containing the user-reflexive data from the first network device to the second network device through the network, the second communications signal being out-of-band through the network relative to the first communications signal.

18. A device for differentiating network services, comprising:
   means for receiving a user request at a first network device;
   means for associating, at the first network device, user-reflexive data with the user request, the user-reflexive data including data that is referenced to the user;
   means for transmitting the user request and the associated user-reflexive data from the first network device to a second network device; and
   means for providing, from the second network device, the user request and return data instructions to a destination server to direct the destination server to respond with return data according to the return data instructions, the return data instructions being based on the user-reflexive data;
   wherein the means for transmitting the user request and the associated user-reflexive data includes (i) means for sending a first communications signal containing the user request from the first network device to the second network device through a network, and (ii) means for substantially contemporaneously sending a second communications signal containing the user-reflexive data from the first network device to the second network device through the network, the second communications signal being out-of-band through the network relative to the first communications signal.

* * * * *